(12) United States Patent
Kofman et al.

(10) Patent No.: US 6,499,842 B1
(45) Date of Patent: Dec. 31, 2002

(54) FOODSTUFFS IMAGING PROCESS AND APPARATUS

(75) Inventors: Leonid M. Kofman, Brooklyn, NY (US); Christopher J. Hill, Bellmore, NY (US); Sigfried Stiber, Freeport, NY (US); Ilya L. Miller, Brooklyn, NY (US); Yuriy D. Chernov, Brooklyn, NY (US)

(73) Assignee: Chocolate Printing Company, Inwood, NY (US)

( * ) Notice: Subject to any disclaimer, the term of this patent is extended or adjusted under 35 U.S.C. 154(b) by 0 days.

(21) Appl. No.: 09/686,679

(22) Filed: Oct. 11, 2000

Related U.S. Application Data

(63) Continuation-in-part of application No. 09/419,669, filed on Oct. 15, 1999, now Pat. No. 6,230,073.

(51) Int. Cl.[7] .................................................. B41J 2/01
(52) U.S. Cl. ...................................................... 347/105
(58) Field of Search .............................. 347/105, 101, 347/87, 20, 43, 86, 58, 5, 15, 14, 2, 4, 19; 358/1, 9; 426/87, 383; 118/13; 700/204

(56) References Cited

U.S. PATENT DOCUMENTS

| | | | |
|---|---|---|---|
| 4,168,662 A | 9/1979 | Fell | 101/492 |
| 4,455,320 A | 6/1984 | Syrmis | 426/383 |
| 4,531,292 A | 7/1985 | Pasternak | 426/383 |
| 4,548,825 A | 10/1985 | Voss et al. | 33/18.1 |
| 4,578,273 A | 3/1986 | Krubert | 426/87 |
| 4,631,548 A * | 12/1986 | Milbrandt | 347/15 |
| 4,668,521 A | 5/1987 | Newsteder | 426/87 |
| 4,843,958 A | 7/1989 | Egosi | 101/2 |
| 4,905,589 A | 3/1990 | Ackley | 101/35 |
| 4,910,661 A | 3/1990 | Barth et al. | 700/66 |
| 5,162,119 A | 11/1992 | Pappas et al. | 425/92 |
| 5,505,775 A | 4/1996 | Kitos | 118/14 |
| 5,795,395 A | 8/1998 | Ben-Matitayhu et al. | 118/712 |
| 5,800,601 A | 9/1998 | Zou et al. | 106/31.65 |
| 5,834,047 A | 11/1998 | Ahn | 426/383 |
| 6,227,643 B1 * | 5/2001 | Purcell et al. | 347/19 |

\* cited by examiner

*Primary Examiner*—John S. Hilten
*Assistant Examiner*—K Feggins
(74) *Attorney, Agent, or Firm*—Dilworth & Barrese, LLP

(57) ABSTRACT

An apparatus for printing an image on a generally non-absorbent surface of a food item selected from the group consisting of chocolate, cheese and the like or a combination thereof includes a computer allowing an operator to create a unique template for the food item. The apparatus further includes software adjusting a scanned image to the created template and a production line controllably operating a process of making the food product that corresponds to the template. Also, the apparatus has a mechanism for treating the surface of the food item so as to directly print the image on its non-absorbent surface.

8 Claims, 8 Drawing Sheets

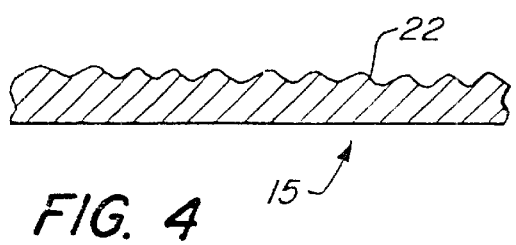
FIG. 4
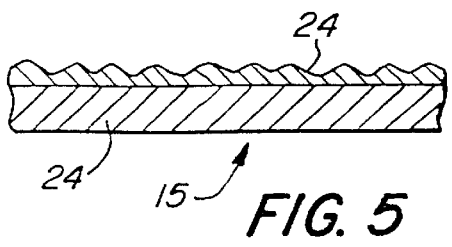
FIG. 5
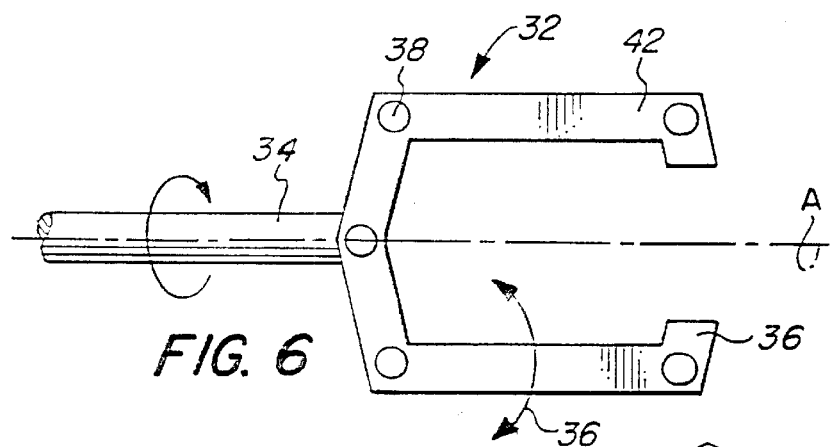
FIG. 6
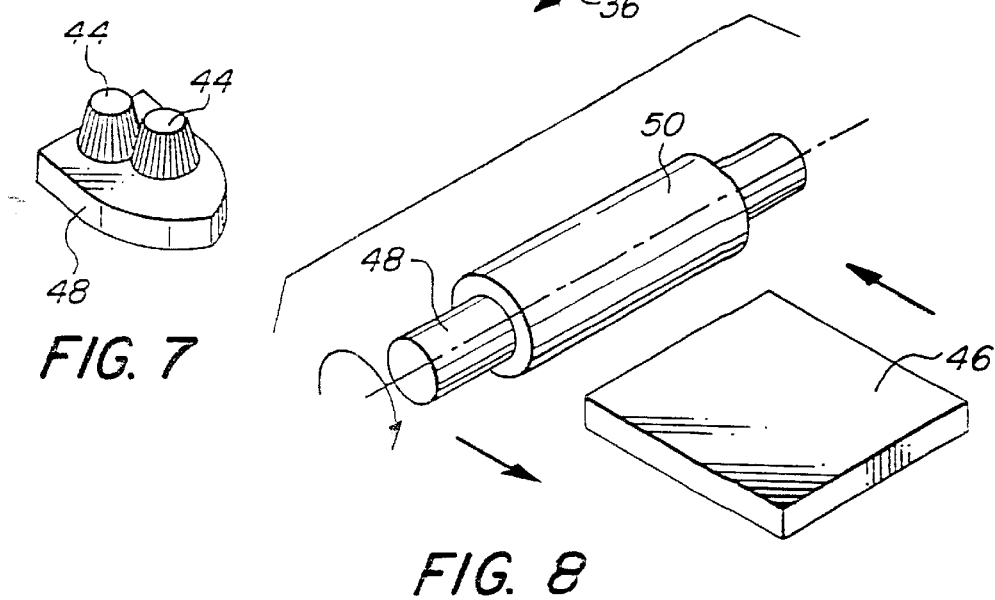
FIG. 7
FIG. 8

FOODSTUFFS IMAGING PROCESS AND APPARATUS

PRIOR APPLICATION

This application is a continuation in part of the U.S. patent application Ser. No. 09/419,669 filed Oct. 15, 1999 now U.S. Pat. No. 6,230,073 and fully incorporated herein.

FIELD Of THE INVENTION

The invention relates to an apparatus for reproducing an image onto foodstuffs, such as chocolates, cheese, or the like. Particularly, the invention relates to an apparatus, and the method of its usage, for printing any pictorial representation desired for reproduction upon the surface of any related type of aforementioned items with edible ink.

BACKGROUND OF THE INVENTION

The application of decorative means to various foodstuffs, such as the surface of a cake, essentially derived over the years as an individual craft of the artisans skilled efforts in providing personalized decorations to such components. For example, early ornamentations provided to cakes, cookies and related types of foodstuffs, fairly well depend upon the skill, dexterity, and imagination of the baker, in order to get any facsimile of decoration upon the finished food product.

Various substitutes to skilled artisans have by necessity been devised for use for decorating food products, and, recently, automated systems for cake decoration have been appeared on the market which allow decorating on an automatic basis. For example, U.S. Pat. No. 5,834,047 to Ahn relates to a process of imprinting diverse shapes of multiple colors inside the confectionery products with edible ink. An edible mixture of confectionery material is filled and solidified in a mold which is presses upon by a plurality of etching plates of a predetermined shape and according to predetermined colors. The mold is rotated with a predetermined angle and number of times to disperse edible ink more than once with different colors on the surface of the solidified confectionery material. Since shapes and color combinations can be too complicated, this process may be time consuming and may be difficult to implement on the hard surface of opaque food items, such as chocolate.

U.S. Pat. No. 5,505,775 to Kitos discloses another cake decorating system, wherein a digitally stored image is transferred to the top of a cake using a print head that includes a drop-on-demand ink expulsion system which has a nozzle plate directing edible ink toward the cake's surface. This system relies on the accurate alignment and rigidity of thee three-axis system to preserve image fidelity. Any departure from perpendicularity, particularly in the x and z-directions, and any play in the mutual alignment of the head supporting arm and the slide assembly supporting the cake, is reflected in a noticeable deterioration in the quality of the picture on the surface of the cake.

U.S. Pat. No. 5,795,395 to Ben-Matitayhu et al., discloses an apparatus for decorating a cake by providing a movable printing head that dispenses edible ink at positions corresponding to the pixels of a digital image. The head and the cake are displaceable relative to one another by means of a leveling mechanism, which includes adjustable legs supporting the cake supporting table. Since the head is displaceable only laterally, it is easier to keep an arm supporting the head than is the case with the above-discussed patent to Kitos. While both these methods achieve satisfactory results with products having porous surfaces, it may not be applicable to hard-surface items because the hard surface should be specifically treated so as to be able to contain edible ink.

U.S. Pat. No. 4,578,273 discloses a method of forming a food product by providing a hard, non-porous icing surface on a baked product upon which an image is imprinted. However, it may be difficult to use a jet printing method on the icing surface because edible ink may spread around this icing surface, if the latter is not properly thermally and mechanically treated.

U.S. Pat. No. 4,668,521 to Newsteder discloses a typical process of forming an image on chocolate. The method includes a step of forming a photoengraving metal plate coated with an insoluble photo-etch material. The transparency bearing a halftone image of the original is placed over the plate and is exposed to ultraviolet light so as to record the halftone image on the plate's surface. After treating the plate with an acid and allowing it to dry, highlighted and shadow areas representing the halftone image is clearly discernable. The method further provides casting a screen against the plate so as to transfer the true image on a chocolate. This method requires manufacturing molds and screens and may not achieve satisfactory results of transferring the image on chocolate.

It is therefore desirable to provide an apparatus for jet printing an image directly onto a generally non-absorbent hard surface of chocolate without manufacturing additional molds and screens. Also, it is desirable to provide an apparatus of the type described above that is capable of providing high definition imaging transfer onto a non-absorbent surface of a food item. An apparatus that provides simple and reliable alignment between an item and a printing head is also desirable, as is a method for transferring an image on a hardened generally non-absorbent surface that can be automated. Also, an apparatus of the type described above that can function in a fully automated mode and a semi-automated mode is desirable, as is a control system for identifying authentic components of the apparatus.

SUMMARY OF THE INVENTION

This is achieved by an automated system enabling the transfer of any pictorial representation onto a generally non-absorbent surface of a food item, particularly a chocolate item, by scanning the representation and jet-printing edible ink directly onto this surface. The automated system may include software executing on a computer which is programmed to control a printer provided with edible ink.

The automated system has software executing on the computer for automatically selecting a size and shape of a prototype of chocolate items. It further has a means for scanning an image and adjusting the image on the prototype, according to which a mold is selected or made.

The automated system may further automatically control a temperature in a heater and displacement of the filled mold along a conveyor delivering the mold through a cooling station towards a preparation station. According to the invention, the preparation station may have an automatically controlled gripping mechanism adapted to separate the hardened food item from the mold. This gripping mechanism may controllably turn the food item at a 180° angle so as to position the separated product on a movable product stabilizer.

Preferably, the product stabilizer is comprised of a movable surface formed with a plurality of formations, each corresponding to a particular shape and size of the preselected food item. The movable surface is controllably displaceable to place the top surface of food items in the same predetermined horizontal plane, although these items may have the different overall thickness. This aspect of the invention is significant because a very few adjustments have to be made between a printing head and the top surface of an item to be printed upon during image printing.

In another aspect of the invention, the automatic system further includes a surface preparation system that is controllably positioned to treat the hard surface of the food item so as to prepare it for subsequent image printing. The surface preparation system is controllably displaceable relative to the food item to mechanically treat this top surface during a predetermined time, which is a function of the preselected size and shape of the food item.

Preferably, the surface preparation system, in accordance with invention, is comprised of rotatable brushes arranged to have their orbits overlap one another so as to cover the entire surface of the food item. Yet a linearly displaceable roller formed with a textured surface that controllably treats the top layer of the food item is also contemplated by the invention.

According to a further aspect of the invention, the automatic system also has a jet printer having a protective member that prevents a printing head from contacting the top surface of the item. The protective member can be a mechanical screen juxtaposed with the printing head or it can be a system of sensors generating warning signals, in response to which a desirable distance between the head and the top surface is controllably maintained.

In accordance with still another aspect of the invention, the automatic system includes a CPU with software executing thereon for switching a printing preparation station, which includes the printer and a support table, between a fully automated mode and a semi-automated mode. The semi-automated mode allows an operator to control color quality of edible ink before an image is printed, whereas the fully automated mode is characterized by automatic color-management software.

Still a further aspect of the invention is primarily concerned with a safety of a product thus prepared and particularly includes a control system capable of identifying authenticity of several components of the printing preparation system. Particularly, the control system is capable of identifying an authentic cartridge carrying edible ink, as well as the ink itself.

It is therefore an object of the invention to provide an automated production system capable of jet-printing a pictorial representation directly onto a generally non-absorbent surface of a food item.

Still another object of the invention is to provide an automated system for controllably treating a surface of a food item, upon which an image is to be printed in accordance with a shape and size of the preselected food item.

A further object of the invention is to provide an automated system for automatically placing a food item so as to have its top surface fixed in a predetermined position with respect to a printing head the jet printer.

Yet another object of the invention is to provide an automated system for automatically creating a variety of shapes and sizes of a food item.

Another object of the invention is to provide an automated system for controllably operating a jet printer, which is programmed to automatically transfer a preselected image on the top surface of a food item by means of edible ink.

Another object of the invention is to provide a method of automatically operating a production line for preparing a food item.

Still another object is to provide a method for designing a food item having specific shape and size and for adjusting an image on the designed food item so as to jet print the image on its hardened surface.

A further object of the invention is to provide a printing apparatus capable of operating in fully a automatic mode and a semi-automatic mode, wherein an operator is able to control and adjust colors of edible ink.

Yet another object of the invention is to provide a control system capable of identifying authenticity of components of the printing apparatus in accordance with the invention.

BRIEF DESCRIPTION OF THE DRAWINGS

FIG. 4 is a cross-sectional view of a bottom of a mold.

FIG. 5 is a cross-sectional view of a bottom of a mold provided with a textured layer.

FIG. 6 is a diagrammatic view of a gripper.

FIG. 7 is a diagrammatic view of one embodiment of a surface treating apparatus.

FIG. 8 is a diagrammatic view of another embodiment of a surface treating apparatus.

FIG. 9 is an isometric view of another embodiment of a food item carrier.

DETAILED DESCRIPTION OF THE DRAWINGS

Figures 1, 2:
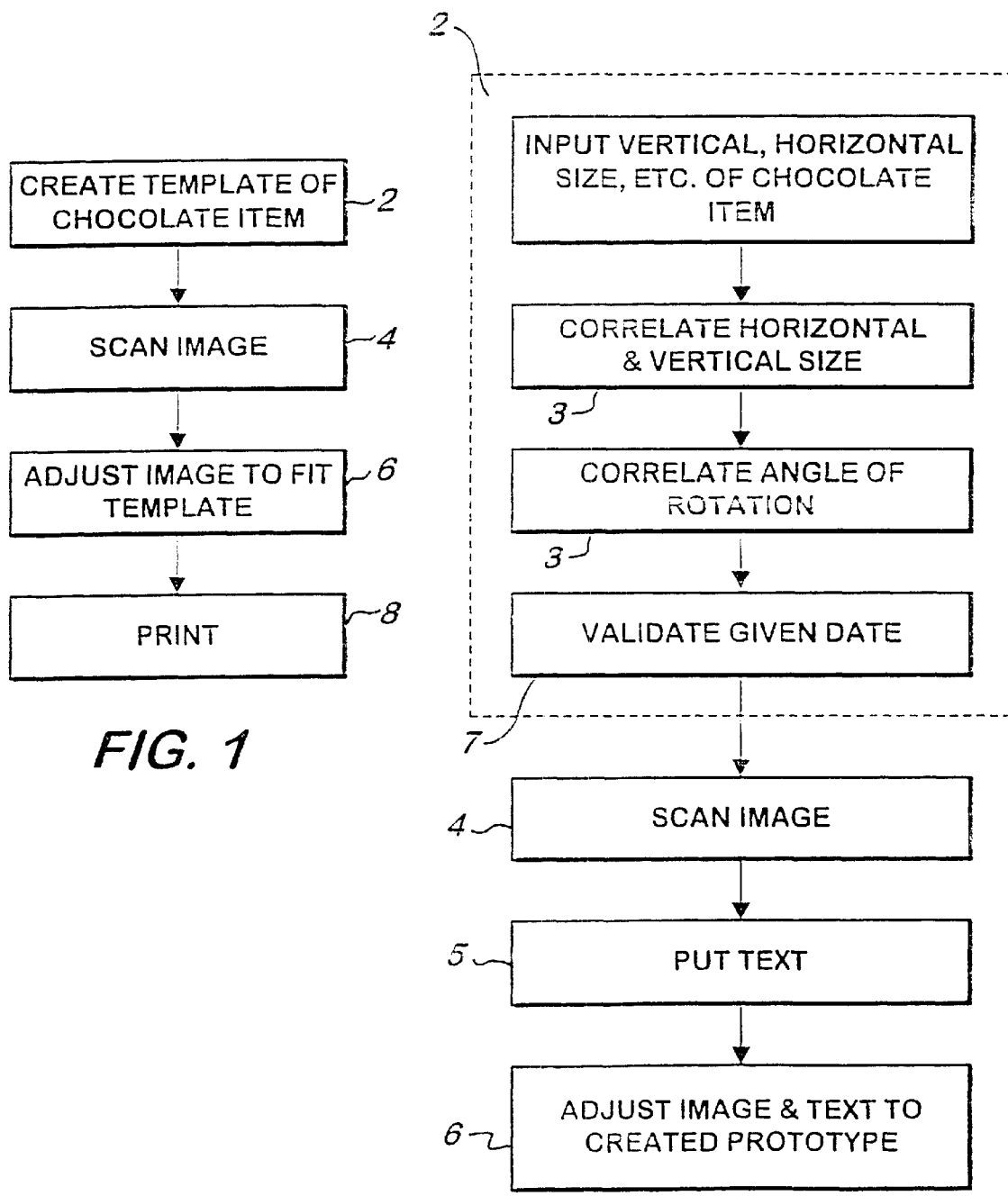
FIG. 1 is a flow chart of a process in accordance with the invention.
FIG. 2 is a more detailed flow chart of a step of creating a prototype of the food item according to a process of FIG. 1.

Referring to FIG. 1, one of the preferred embodiments of the invention, shown by way of a flow chart, achieves the above-stated objects by printing a pictorial image, a verbal statement or a combination thereof directly on a hard, generally non-absorbent surface of a food item. Particularly, an operator using software creates a prototype of a chocolate product at 2. The chocolate product can have different shapes, forms and sizes. An algorithm, shown in FIG. 2 and allowing an operator to correlate horizontal and vertical size of the prototype at 3 as well as an angle of rotation at 5, can do this. Upon completion of the prototype, all necessary data is both validated and stored in database 7.

Having created a template of the chocolate item, the operator scans an image 4 to be printed on a chocolate's hardened surface, and further adjusts a size thereof at 6 so it can fit the previously created prototype. Alternatively, the prototype of the chocolate item still may be modified to fully fit the desirable image. In addition to adjusting the image, the operator may further add a text 5, a position of which can also be adjusted.

Once the operator is satisfied with the created design, a signal is sent to a printer to enable it to print the image with edible ink on a real chocolate item that has been manufactured according to the created prototype, as will be now explained with reference to FIG. 3.

Figure 3:
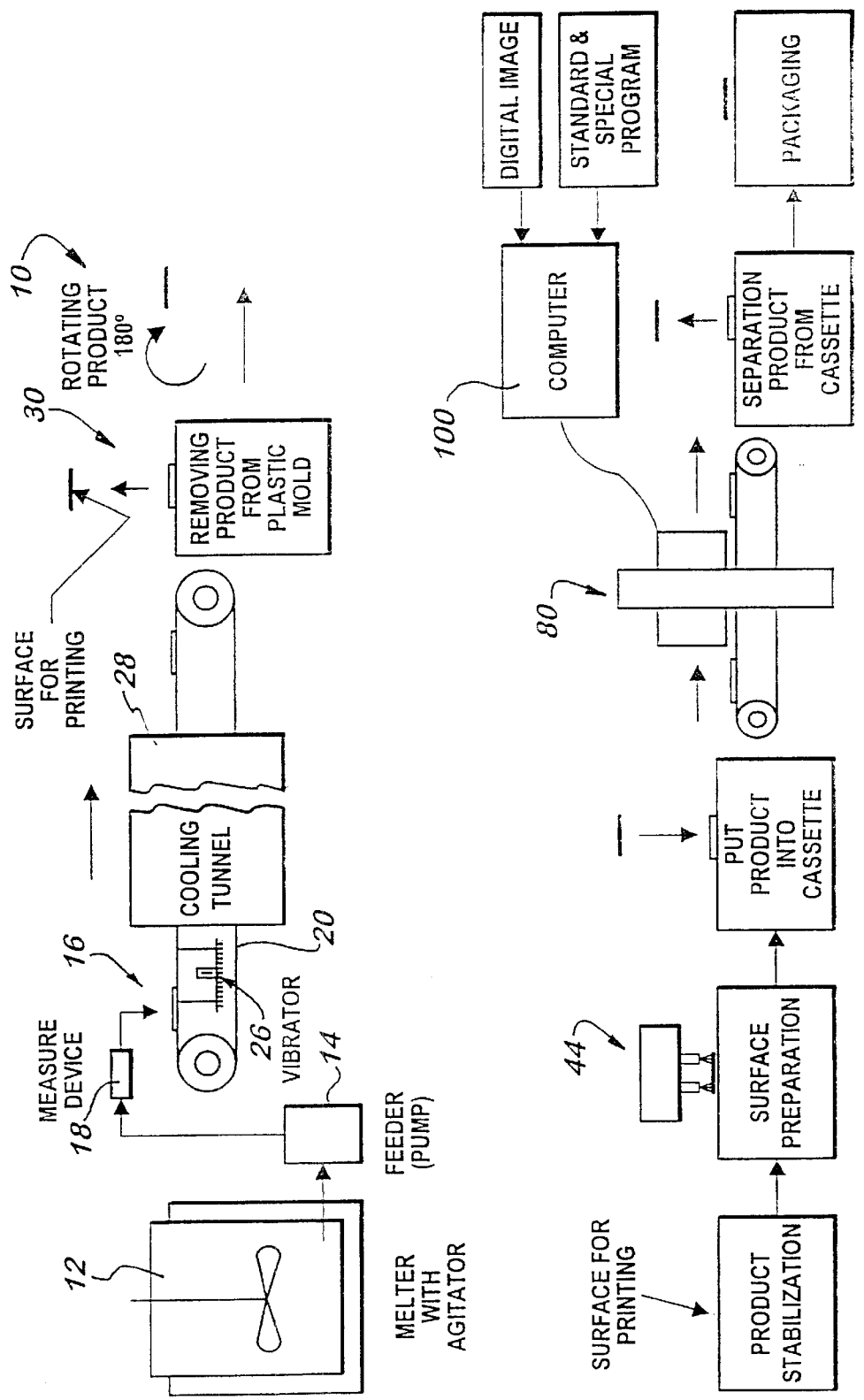
FIG. 3 is a diagrammatic view of a technological production line of a process of FIG. 1.

Particularly, FIG. 3 illustrates a process of manufacturing a chocolate item. If a manufacturing facility is relatively small and primarily serves individual customers, some of the process steps may be manually performed. However, if a manufacturing facility is geared to mass production, the process may be automated. In accordance with the invention, a production line has a certain sequence of operations characteristic to both partly automated and automated processes, as illustrated in FIG. 3.

Referring to FIG. 3, an automated system 10 in accordance with the invention is generally shown and includes a few stations collectively defining a production line of a product, preferably a chocolate product. Particularly, a heater heats chocolate mass that has undergone blending, refining, conching, tempering and cooling stages, as known in the art, approximately to a temperature which is at least 92° F. The heater basically includes a reservoir 12 filled with chocolate mass that is treated by an agitator 14. The properly conditioned mass is then delivered by a pump 14 to a distribution station 16 that pours it into a mold 15 that has been formed according to the computer-created prototype. It is understood that a chocolate item may have a variety of shapes including customized shapes and standard ones. This variety of shapes and sizes of customized molds 15 is limited only by technological capabilities and requirements of a facility and may include irregular, polygonal, star-like and etc. Rectangular, circle or/and oval shape can be considered to be standard.

A small operation facility may rather use a semi-automatic step of filling the mold by utilizing a digital volume control that allows a pump 14 to be selectively turned on and off. However, it is contemplated within the scope of this invention to automatically control the work of a measuring device 18 and the pump as a function of the mold's volume, quantity of similar molds and frequency at which each mold is delivered to the filling station. The measuring device 18 may be equipped with a controllably operating filling means which can be selectively open for predetermined time in response to a signal received from a central processor unit (hereinafter CPU) 100. Specifically, an electronic counter turning the pump 14 off in response to reaching a predetermined count measured by a control circuit of the CPU 100 in response to the known volume of the mold, can be an example of a controlling system monitoring automated filling of the mold.

Upon filling the mold 15, it is placed on a continuous conveyor 20. In accordance with one aspect of the invention as shown in FIG. 4, each mold has its bottom 22 textured so as to apply a slight degree of unevenness to the chocolate's surface facing this bottom. Alternatively, the mold's bottom may be substantially flat and be covered by a removable layer 24 which, as shown in FIG. 5, has its surface textured analogously to the mold's bottom shown in FIG. 4. Amplitude of peaks formed on this textured surface may not exceed a fraction of a millimeter.

Returning to FIG. 3, to improve conformity of the chocolate mass with the selected mold, the system, as known in the prior art, has a vibrator 26 operatively connected with the endless conveyor 20. Advantageously, the conveyor 20 extends through a cooling tunnel 28 where the chocolate mass is cooled approximately to a temperature of 50–60° F. After gradually bringing the cooled chocolate mass to an ambient temperature, preferably to 85–91° F., the chocolate product is delivered to a preparation station 24, generally shown in FIG. 3.

The above-discussed steps can be manually controlled by periodically turning on the vibrator and the conveyor, which can be suitable for a small manufacturing facility. Alternatively, it also may be fully automated and controlled by the CPU 100 so as a speed of conveyor can be calculated and controlled as a function of a particular shape, material and volume of the mold 15 as well as specifics of chocolate mass. Further, the conveyor's speed can, be a function of a rate at which both, the mold and the chocolate mass, cool down. Since the cooling step is followed by removing the chocolate from the mold, as will be explained hereinbelow, it is of utmost importance to know a precise moment of time when the cooled chocolate item can be easily removed from the mold.

Once the chocolate product has been cooled down to a desirable temperature, it has to be removed from the mold since a surface mostly suitable for further treatment is the one that faces the bottom 22 of the mold 15. Similarly to previously described operations, the mold may be manually rotated at a 180° to allow the chocolate product to slip down from the plastic mold 15. Preferably, however, as shown in FIG. 6, this operation is automated by utilizing a gripper 32 including a horizontal rod 34 and generally U-shaped arms 36 which are articulated on the rods by means of joint 38 to rotate about an axis A—A. The arm may have a pair of jaws 42 displaceable about the joints 38 in a direction of an arrow 40 so as to adjust a grip to a different shapes and diameters of the mold 15. The jaws may be manufactured to have a shape corresponding to any shape of the mold, or may have multiple parts displaceable relative to one another to conform to variously shaped molds. In case of the multi-part jaws, it is conceivable to have a control circuit of the CPU 100, receiving information including a shape and size of the mold 15, that automatically displaces the jaws 42 relative to each other. Once the mold is received between the jaws, the arms 36 rotate at a 180° angle to separate the product from the mold.

In accordance with another aspect of the invention, the preparation station further includes a surface treatment apparatus that may have different designs. Characteristic to all possible implementations of such treatment apparatus is the concept of treating a top layer of the product so as to allow specifically designed edible ink to accurately and properly adhere to the product.

Specifically, according to one embodiment of such apparatus as shown in FIG. 7, brushes 44 have overlapping orbits so as to cover the entire surface of the product 46 upon their rotation about parallel axes. Once again, a motor (not shown here) actuating these brushes or a single brush can be turned on and off manually. Advantageously, the motor automatically controlled by the CPU 100 is turned on for a period of time which is sufficient to satisfy requirements applied to a surface and which is typically selected and maintained based on an empirical data. Clearly, a working time period is a function of shape and temperature of the surface.

Still another implementation of the treatment apparatus may be a roll 48 formed with a peripheral surface 50 which is capable of treating the top layer of the product 46 upon displacement of the roller and the product 46 relative to each other, as diagrammatically illustrated in FIG. 8. Also, displacement of this roller in a vertical direction may be automatically controlled to penetrate the top surface at a desirable distance. Optionally, either after or before removing the product 46 on the table 52, it is possible to thermally treat a surface of the food item that has been spaced from the mold's bottom so as to attach it to a differently colored chocolate layer.

Figure 9:
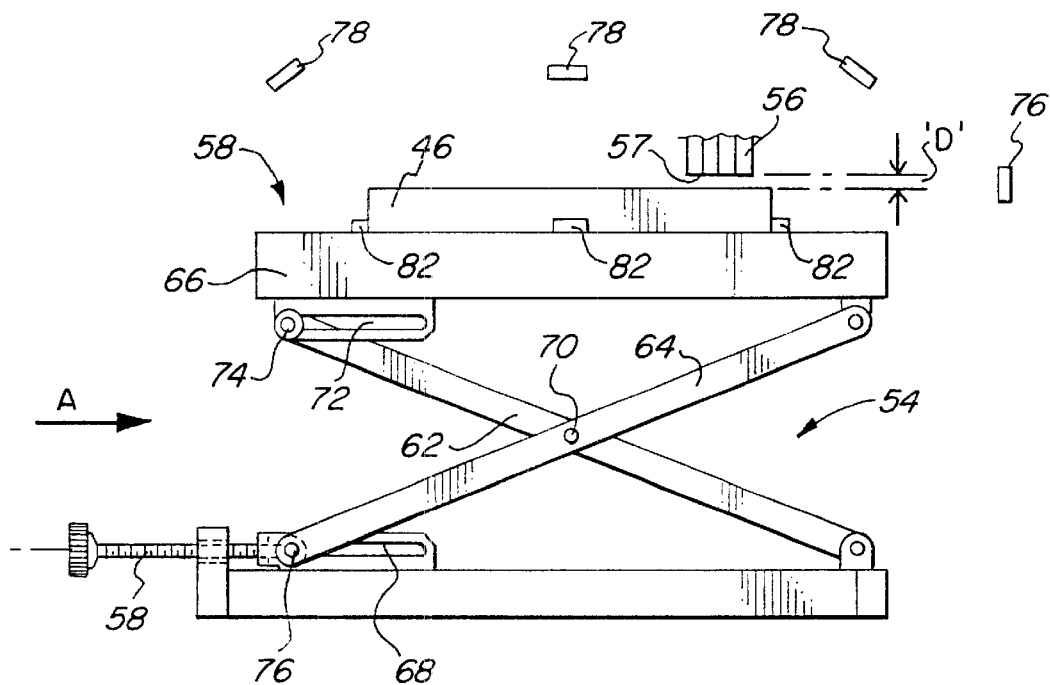
FIG. 9 is a side view of a delivery table carrying a food item to a printing station.
Figure 10:
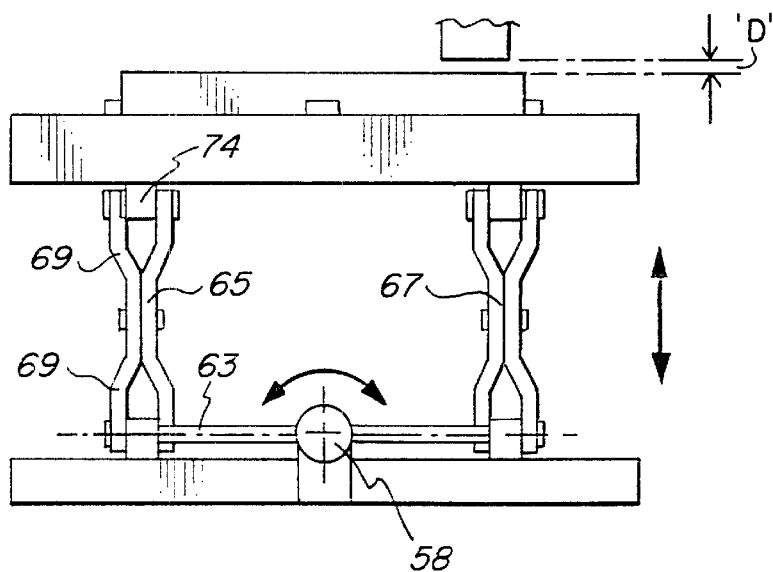
FIG. 10 is a front view of a delivery table shown in FIG. 8.

In accordance with still another aspect of the invention, the product 46 upon its removal from the mold 15 may be placed on a displaceable table 52, as shown in FIGS. 9 and 10. Typically, the product removed from the mold 15 is placed on a continuous conveyor that delivers the item towards a printing station 80 (FIG. 3). Since a distance between a printing head 56 of the printer and the top surface of the chocolate product cannot exceed a few millimeters sufficient to provide a high quality image printing, a problem of controlling this distance becomes critical to a high quality end product.

Obviously, the simplest solution to this problem would be to have the printing head displaceable only in a horizontal plane spaced from the top surface of the product at a uniform fixed distance. In practical terms this is almost impossible to achieve because regardless of how uniform a depth of the mold 15 is, a thickness of products still varies from one mold to another. Thus, this variation in thickness necessitates adjustment of the head.

In order to avoid it, according to another aspect of the invention illustrated in FIGS. 9 and 10, a product is placed on the displaceable table 52 that has a parallelogramatic support 54 providing easy vertical adjustment of the product relative to the printing head 56. Particularly, an actuator 58 displaces a horizontal cross bar 63 simultaneously actuating horizontal displacement of lower ends of legs 65 and 67 that are guided along horizontal guides 68 in a direction A (FIG. 9). Upper ends of the legs are provided with pins 74 which while being guided along a closed path guides 82 simultaneously press against elongated surfaces of the guides so as to raise the support 66 in response to actuation of the lower ends of the legs.

Specifically, each of the legs includes upper and lower U-shaped end portions 69 and two supporting bars 62, 64 forming an X configuration, as shown in FIG. 10. The upper end of the supporting bar 62 is horizontally movable along the guide 72 and displaces the support 66 in a vertical direction synchronously with an upper end of the support 64. Such displacement allows the table to adjust a distance D between the top surface of the product and the printing head which, upon reaching a predetermined value, is detected by a sensor 76.

As is the case with the previously described operations, vertical adjustment of the support may be performed manually by an operator who actuates the actuator 58, which can be, for example, a simple screw. Advantageously, the CPU 100, controllably actuating the screw 58 until the top surface of item 46 reaches a predetermined distance detected by the sensor 76, automatically controls this operation.

As an additional safety measure, the printing head 56 may be provided with a protective screen 57 preventing the head from contacting the top surface of the food item or the position sensor 76 generating a signal that automatically arrests displacement of the table, as explained above.

Since the printer is stationary fixed, it is easy to move the table 52 to a predetermined initial position which is the same for all-possible shapes and forms of the product. Position sensors 78 controlling displacement of a transporting means (now shown here), on which the displaceable table 52 is fixedly mounted, monitor control of this initial position. Once the position is reached, the transporting means is stopped. To even further facilitate centering of the product in a predetermined position, the support 66 has guides or stoppers 82 controllably displaceable to peripherally abut the product 46 in this position. By arresting displacement of the product on the support, positioning of the product relative to the printing head becomes a simple routine.

Figure 11:
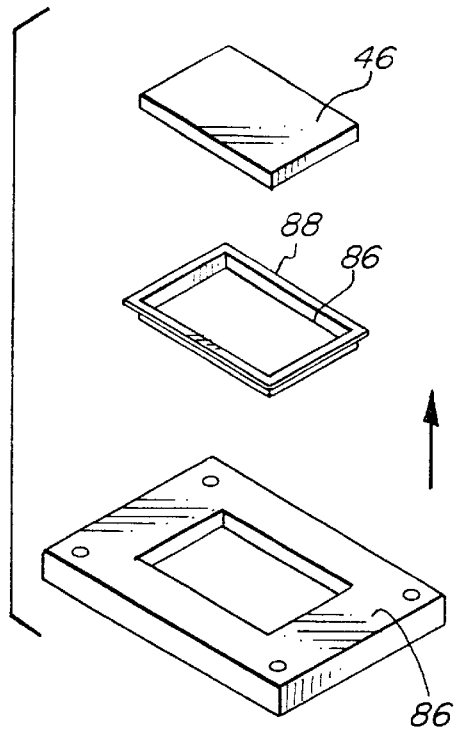
FIG. 11 is an exploded view of a cassette receiving a food item for centering it on a table of FIGS. 9 and 10.
Figure 12:
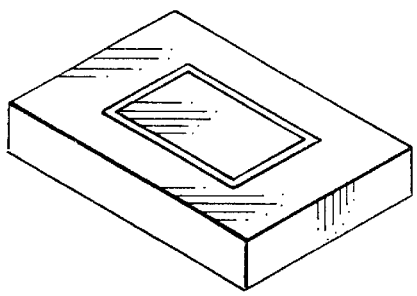
FIG. 12 is an isometric view of a cassette shown in FIG. 11.

The product 46, as described above, can be placed on top of the support 52. However, during printing, the upper surface of the support can be painted by edible ink jetted upon the top surface of the product. To prevent it, the product upon removing from the mold may be placed in a cassette shown if FIGS. 11 and 12. Particularly, the cassette has a base 84 formed with an opening that receives a frame 86 having dimensions corresponding to the product 46. The frame is so shaped that the top surface of the product lies flush or a notch lower than a rim 88 of the frame, which extends laterally outwardly to allow the top surface of the product to be completely open for receiving an image.

Figure 14:
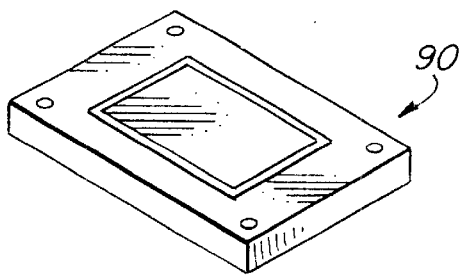
FIG. 14 is an isometric view of the transporting box of FIG. 13.
Figure 13:
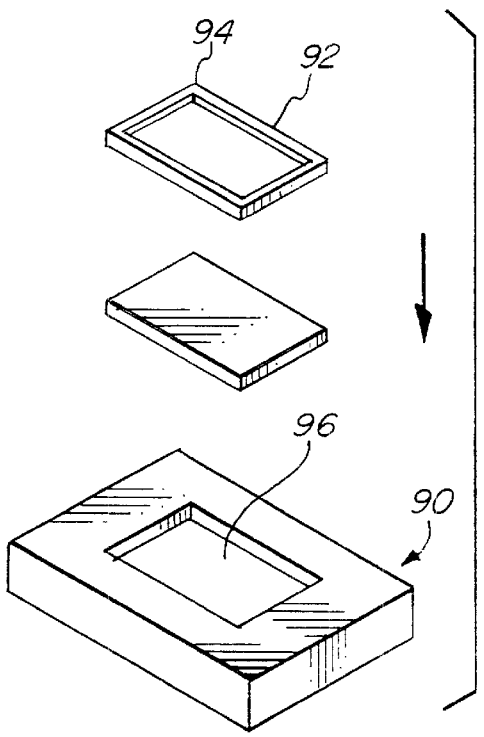
FIG. 13 is an exploded view of a transporting box receiving a ready to be delivered food item.

Upon printing the image, the product can be automatically packaged in a box 90 by (FIGS. 13, 14) initially receiving the product in its opening 96 sized so that a frame 92 is placed between an inner periphery 98 of the opening 96 and the product. The frame is formed with inwardly extending rim 94 protecting the product during transportation.

Figure 15:
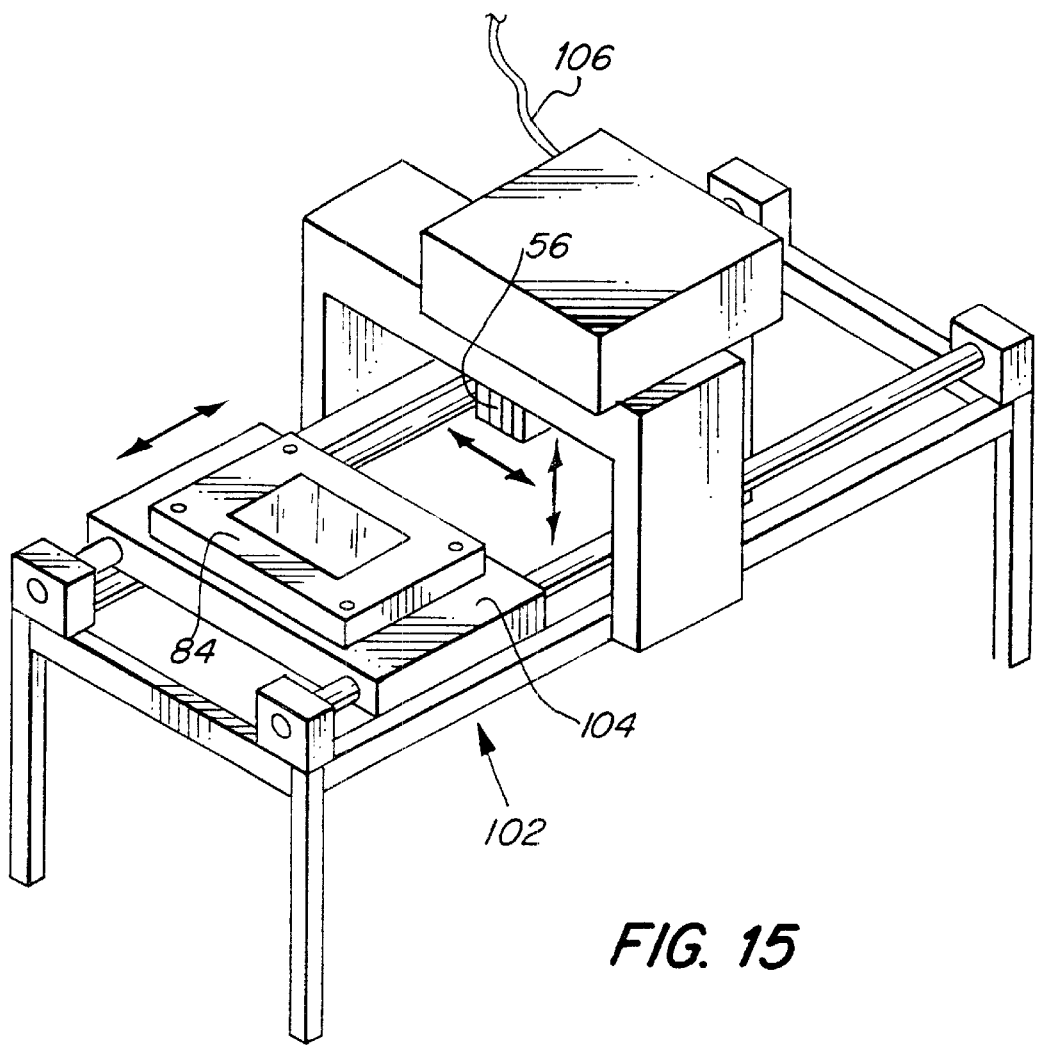
FIG. 15 is an isometric view of another embodiment of a delivery table carrying a food item to a printing station.
Figure 16:
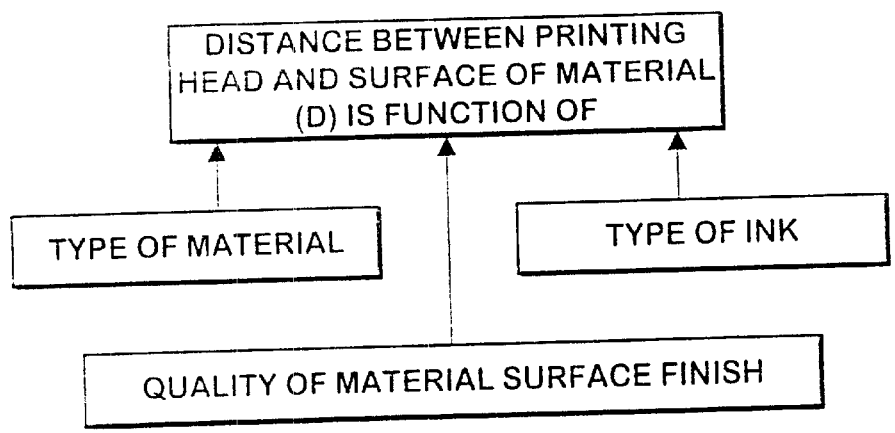
FIG. 16 is a flow chart of a control unit of the printing station in accordance with FIG. 15.

According to a further aspect of the invention shown in FIGS. 15 and 16, the cassette's base 84 can be positioned on a separate support 102 having a controllably movable support 104 that delivers the cassette toward the printing head 56 of a printer 106 provided with an ink delivery system. This delivery system may be provided with a multi-compartment reservoir containing different colors of ink and made of FDA approved materials. In this embodiment, instead of the vertically adjustable table 52, the printing head can be controllably movable in a vertical direction V. However, it is understood, that the above-mentioned table 52 can be easily mounted on the movable support 104 to follow the mode of its operation, as explained in reference to FIGS. 9 and 10.

Figure 17:
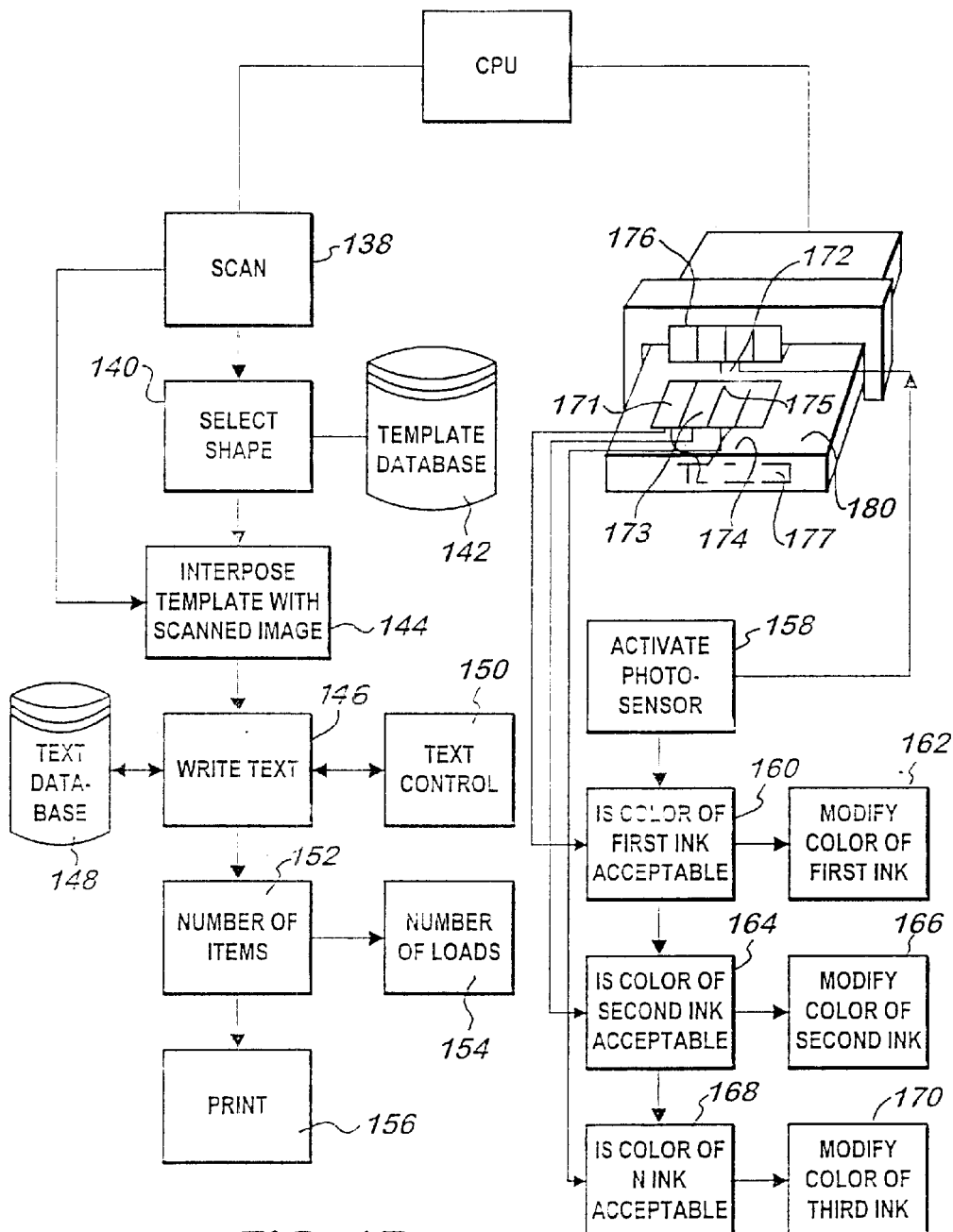
FIG. 17 is a flow chart illustrating a multi-mode operation of the apparatus in accordance with the invention.

An apparatus in accordance with the invention can operate in different modes, as shown in FIG. 17. An automatic mode is characterized by a fully automatic system for adjusting colors. The present apparatus utilizes a-four-color combination of edible inks including magenta, cyan, yellow and black. Obviously, the black color can be obtained by mixing up the first three colors in equal proportions.

Softwarte executing on a CPU and responsible for the automatic operation of the apparatus allows an image to be printed first to be scanned at 138. The image can be delivered by any means including electronic media. After the image has been scanned, the operator by means of a scroll-down menu, which appears on a touch screen, selects one of the variety of templates stored in a template database 142. By utilizing an image control, an operator can zoom in, zoom out and displace the image within the selected template to obtain a desirable position of the image at 144.

After the image has been positioned on the template, an operator can write a text 146. The text can be a standard one and thus be selected from a text database 148, or optionally, the operator can create an individual message. Software allows those areas of the image which are suitable for receiving the selected or written text to be highlighted so as the operator is able to complete an item by placing the text on the image in accordance with his/her preferences at 150.

Having completed the composition of the image, the operator may introduce the number of images to be printed at 152. As disclosed above, the apparatus is provided with cassettes or transport trays receiving a limited number of templates. A transport surface 180 of the apparatus is sized to have only a limited number of transport trays and, thus, if the number of images exceeds the number of trays that can be simultaneously placed on the transport surface, then the operator has to reload new trays after the first portion of images has been printed. The operator receives a written message as how many trays are needed to be filled in accordance with the introduced number of images and, in addition to a purely numerical information, an image with the filled trays is displayed on the screen. Thus, for example if a transport tray is sized to receive 10 heart-shaped images and the operator needs 37 images, four trays, one of which is not fully filled with the images, appear on the screen. Further, if the transport surface is sized to receive for instance 5 trays whereas the introduced number of images require more than that, the screen will inform the operator how many trays should be loaded after the first five have been processed.

After all the preparations have been completed, software automatically provides a modified print calibration color profile to match the colors of edible ink with the scanned image. This color calibration changes the print driver to correctly print the colors by properly mixing the jetted inks on the chocolate.

A semiautomatic mode that has an initial image preparation stage identical to the automatic mode, allows an operator to calibrate the colors in accordance with either a stored data or the operator's taste and experience.

Thus, it is possible to introduce and store a series of desirable spectral characteristics of each of the known colors of edible inks as reference values, so as every time when either new inks are introduced in old cartridges or new cartridges filled with ink are used, an operator may have an option of verifying the quality of the inks. In practical terms, the operator before printing the created images, introduces a sample 174 under a cartridge 176 to have regions of the item's surface painted in magenta 171, cyan 173, yellow 175, and optionally in black. Further, a source of light 177 illuminates each of the differently painted regions and the thus generated light is sensed at 160, 164, and 168 by a photo-sensor 172 that generates a frequency signal representing spectral characteristics of the respective color. Software for controllably displacing the sensor over and above the painted sample can be easily installed in the CPU, so upon introduction of the painted sample the sensor provides a dynamic type of measurement. Alternatively, a photo-resistor serving as a switch can be used. In any case, upon comparison of the detected signal at 162, 166 and 170 with the reference value in a comparator or based on the operator's visual preferences in a manual mode of operation, each color may be modified during the printing process. Thus, for example, if magenta is too dark, then every segment of an image designed to be printed in this color may additionally receive an extra volume of yellow and become somewhat brighter.

The automatic mode of operation is preferable during the mass production, whereas the semi-automatic mode designed to increase the quality of the printed image is preferred for individually created images.

Figure 18:
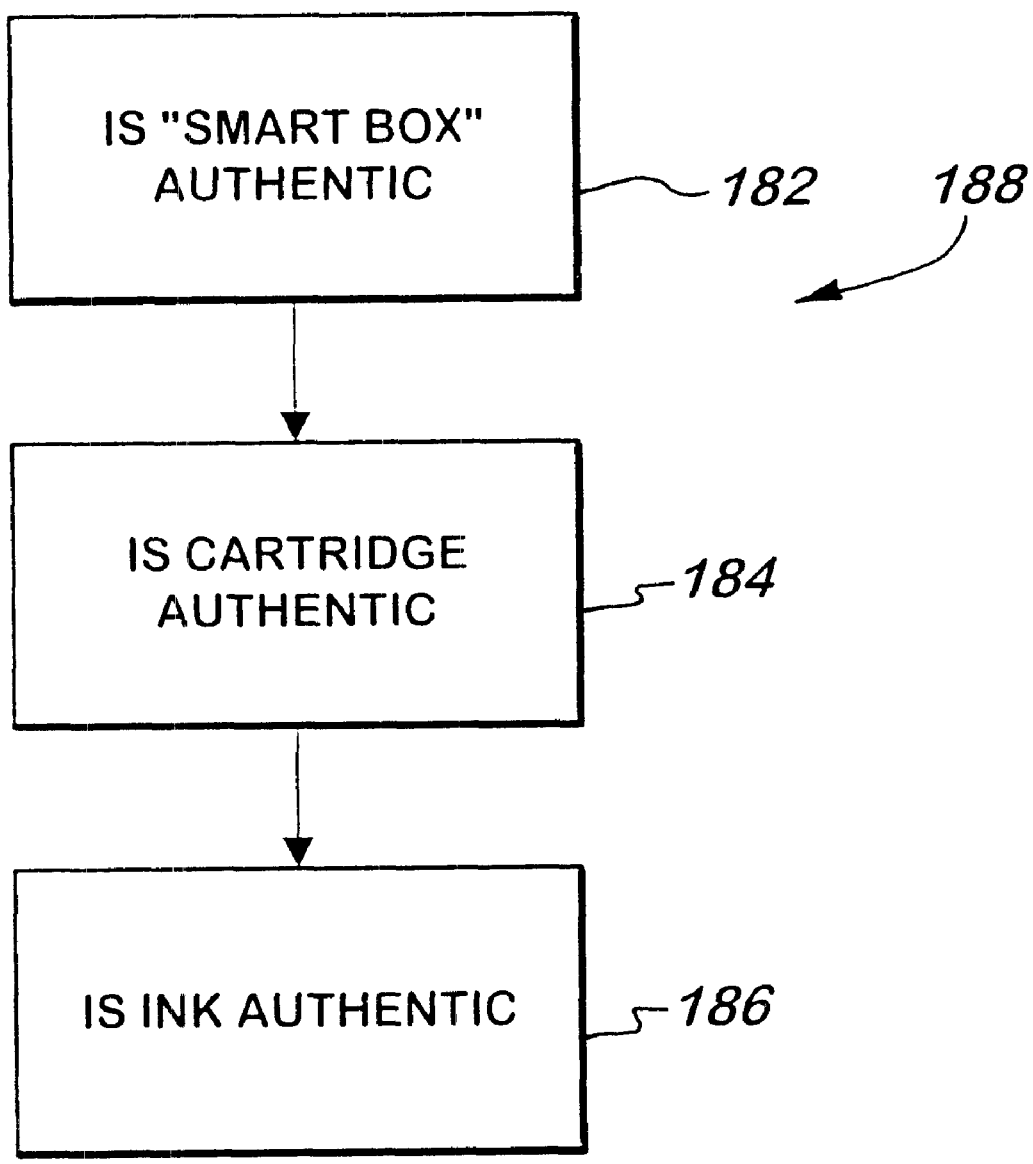
FIG. 18 a diagrammatic view of a safety system utilized in conjunction with the apparatus in accordance with the invention.

Turning to FIG. 18, the apparatus is provided with a system 188 capable of identifying the authenticity the apparatus's components. It is imperative that only the authentic edible ink be used with the apparatus in order to avoid severe health problems that may be caused by non-authenticated inks. A special formula of the edible ink used for printing images on the chocolate obviously can be coded and consists of chemical and physical elements. Density, conductivity and other characteristics of the ink can be measured by generating ultrasound signal, a source of which may be installed on a cartridge, and upon comparison of a response signal with a reference value, the authenticity of the ink is determined. Further, it is possible to detect and verify whether a cartridge is correctly filled with the edible ink. Thus, if the volume of ink in a new cartridge deviates from the designed volume, then it is a good indication that the components have been tempered with. Different technologies can be used to properly authenticate the components of the apparatus including memory chips, smart carts, the ink, such as an RF technology, an ultra-sound technology, and the like. Each of the coded components including cartridges, "smart boxes" processors and components of a computer can have receptacles for receiving electrical connectors to communicate with storage devices, each of which stores a respective code uniquely identifying each of the elements.

Thus, for example, each cartridge can be supplied with a chip programmed to provide a certain verifying operation in response to a signal generated from the CPU. As shown in FIG. 17, if either of a computer or smart box 182, which is equipped with software responsible for a step-by-step operation of the inventive printing method, a cartridge 184 or the inks 186 is detected not to be authentic, the apparatus is blocked from printing. Software also allows the operator to see which one of the main components is not standard by graphically pointing it out on a screen.

The embodiments of the invention which have been described are merely illustrative of a few of the applications of the principles of the invention. Although food products described above mainly relate to chocolate products, it is possible to utilize this invention for printing signs or images on any food product having a hardened surface, such as, cheese. An artisan may make various modifications without departing from the scope of the invention, as recited by the following claims.

What is claimed is:

1. A jet-printing apparatus for printing colored images upon a generally non-absorbent surface of a food item comprising:

a print driver; and a controller operative to control the print driver in an automatic mode, wherein the print driver is controlled with an automatic calibration color profile to correctly print the colors by mixing the jetted edible ink on the non-absorbent surface of the food item after the initial testing mode has been performed, and a semi-automatic mode, wherein the print driver is controlled with a modified calibration color profile to adjust the colors on the non-absorbent surface in accordance with individual preferences of an operator printing images on the non-absorbent surface.

2. The jet-printing apparatus defined in claim 1, further comprising a displaceable cartridge carrier and a plurality of cartridges filled with differently colored edible inks on said cartridge, a source of light, and a photo-sensor for generating a signal representing measured frequency spectral characteristics of each color printed on a testing sheet upon turning the light source on, and a comparator for comparing the generated signal for each of the colors and a respective reference value to modify the jetted ink in response to a correcting signal generated upon the comparison.

3. The jet-printing apparatus defined in claim 1, further comprising:

software executed on the controller for identifying the authenticity of each of the cartridges and components within the computer to prevent the jet-printing apparatus from printing the images if at least one of the cartridges and the components has been tempered with.

4. The jet-printing apparatus defined in claim 3, further comprising:

software executed on the controller for selecting a shape of the food item selected from the group consisting of a polygonal, heart, oval, and round shape and a combination of these shapes;

software executing on the controller for selecting a text to be printed upon the non-absorbent surface of the food item;

software executed on the controller for scanning an image to be printed;

software executed on the controller for automatically adjusting the image on the selected food-item;

software executing on the controller for automatically calibrating color profile to correctly print the colors by mixing the jetted edible ink on the nonabsorbent surface of the food item;

software executing on the controller for identifying the authenticity of the edible ink; and software executing on the controller for controllably displacing the photosensor over the testing sheet.

5. A jet-printing apparatus for printing colored images comprising;

a food item provided with a non-absorbent surface;

a cartridge displaceable over the food item;

a plurality of cartridges displaceable with the cartridge carrier, each of the cartridges being filled with a respective differently-colored ink, each of the cartridges being provided with a respective first storage device storing a code uniquely identifying the manufacturing authenticity of the edible ink;

a computer; and software executing on the computer for identifying the authenticity of each of the cartridges and components with the computer to prevent the jet-printing apparatus from printing the images if at least one of the cartridges and components has been tempered with.

6. The jet-printing apparatus defined in claim 5, further comprising:

software executed on the computer for selecting a shape of the food item selected from the group consisting of a polygonal, heart, oval, and round shape and a combination of these shapes;

software executing on the computer for selecting a text to be printed upon the non-absorbent surface of the food item;

software executed on the computer for scanning an image to be printed;

software executed on the computer for automatically adjusting the image on the selected food-item;

software executing on the computer for automatically calibrating color profile to correctly print the colors by mixing the jetted edible ink on the non-absorbent surface of the food item, and software executing on the computer for identifying the authenticity of the edible ink.

7. The jet-printing apparatus defied in claim 6, further comprising a database for storing a plurality of the shapes of the food item, and a database for storing a variety of texts.

8. A jet-printing apparatus for printing multi-colored images comprising:

a food item having a non-absorbent surface;

a print driver having a supply system operative to selectively deliver a multiplicity of differently colored edible ink upon the non-absorbent surface of the food item;

a controller operative to control the print driver in an initial testing mode, in which each of the differently colored edible ink is delivered on the non-absorbent surface to be evaluated independently from the rest of colored edible ink so that when a color profile of the evaluated edible ink does not correspond to a respective reference value, the evaluated edible ink is replaced, an automatic mode, wherein the print driver is controlled with an automatic calibration color profile to correctly print the colors by mixing the jetted edible ink on the non-absorbent surface of the food item after the initial testing mode has been performed, and a semi-automatic mode, wherein the print driver is controlled with a modified calibration color profile to adjust the colors on the non-absorbent surface in accordance with individual preferences of an operator printing images on the non-absorbent surface after the initial testing mode has been performed.

* * * * *